United States Patent
Schmidt et al.

(10) Patent No.: US 7,058,381 B2
(45) Date of Patent: Jun. 6, 2006

(54) EQUALIZING CIRCUIT WITH NOTCH COMPENSATION FOR A DIRECT CONVERSION RECEIVER

(75) Inventors: Michael Schmidt, Dresden (DE); Wolfram Kluge, Dresden (DE); Tilo Ferchland, Dresden (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 613 days.

(21) Appl. No.: 10/361,088

(22) Filed: Feb. 7, 2003

(65) Prior Publication Data
US 2004/0087290 A1     May 6, 2004

(30) Foreign Application Priority Data
Nov. 4, 2002   (DE) ............................ 102 51 288

(51) Int. Cl.
*H04B 1/10*   (2006.01)
(52) U.S. Cl. .................. 455/307; 455/296; 375/233; 375/346
(58) Field of Classification Search ............... 455/296, 455/307, 310; 375/229, 233, 346, 350, 348; 708/323
See application file for complete search history.

(56) References Cited

U.S. PATENT DOCUMENTS

| 5,661,753 | A  | * | 8/1997 | Iemura ........................ 375/233 |
| 6,625,235 | B1 | * | 9/2003 | Coker et al. ................. 375/341 |
| 6,751,255 | B1 | * | 6/2004 | Reuven et al. ............... 375/233 |
| 2003/0007554 | A1 | * | 1/2003 | Birru ........................... 375/233 |
| 2004/0193669 | A1 | * | 9/2004 | Shirani ....................... 708/819 |

FOREIGN PATENT DOCUMENTS

| EP | 0851637 | 7/1998 |
| EP | 1220441 | 7/2002 |

* cited by examiner

*Primary Examiner*—Edward F. Urban
*Assistant Examiner*—Blane J. Jackson
(74) *Attorney, Agent, or Firm*—Meyertons Hood Kivlin Kowert & Goetzel, P.C.; B. Noël Kivlin

(57) ABSTRACT

An equalizing device with notch compensation for a direct conversion receiver is disclosed. The baseband signal of a direct conversion receiver comprises a notch in the frequency response after the required DC compensation is performed. A bandpass generates a notch compensation signal on from a decision signal and a interference compensation signal of a decision feedback loop. Therefore, the reliability of the decision signal is enhanced and allows an improved data rate in WLAN applications.

31 Claims, 2 Drawing Sheets

EQUALIZING CIRCUIT WITH NOTCH COMPENSATION FOR A DIRECT CONVERSION RECEIVER

FIELD OF THE PRESENT INVENTION

The present invention relates to methods and apparatus used in wireless communication systems and more particularly to an equalizing circuit for a direct conversion receiver device used for the wireless data transfer, for example by wireless local area networks (WLAN), mobile phones and the like.

DESCRIPTION OF THE PRIOR ART

Currently great efforts are being made to develop receiver devices offering a high degree of reliability at low cost. A key issue in this respect is the degree of integration with which a corresponding receiver device may be manufactured. While for many applications, such as direct broadcast satellite (DBS) receivers and WLAN devices, this is of great importance due to cost effectiveness, in other applications such as mobile phones, mobile radio receivers and the like, low power consumption is of primary concern.

Presently, two major architectures for receiver devices are competing on the market, wherein due to the higher degree of integration and the potential for reduction of power consumption, the so-called direct conversion architecture seems to become the preferred topography compared to the so-called super-heterodyne architecture. Super-heterodyne receivers down-convert the received radio frequency (RF) signal to a lower intermediate frequency (IF) signal that may be filtered, amplified or otherwise processed more conveniently. Although the super-heterodyne architecture is well established and allows the fabrication of reliably operating receiver devices, the highly selective IF filters that are necessary for the proper operation of these devices, require the employment of capacitors and inductors of high quality, thereby restricting the degree of integration achievable with a super-heterodyne architecture, since high quality inductors may not easily be implemented into a semiconductor substrate. Moreover, the amplifiers operating at the relatively high IF require relatively large drive currents to provide for the required gain factor so that the power consumption of these devices may not be reduced to the levels of amplifiers operating at relatively low frequencies.

In direct conversion receivers, the RF signal is directly down-converted to a DC level, i.e. the IF is zero, so that the required filters and amplifiers, except for a low noise amplifier and input filter, may operate at baseband frequencies. Thus, the required filters may be integrated into the chip bearing the all or most of the residual circuitry, while at the same time power consumption of the involved amplifiers is significantly lower than in the super-heterodyne architecture. Despite these advantages, direct conversion devices exhibit a serious drawback in that an undesired DC offset of the baseband is introduced by different sources. A DC offset may be generated in amplifiers or other circuit devices of the receiver caused by temperature shift, aging, crosstalk, and the like. Additionally, undesired non-linearities of the mixer and/or undesired signals at the mixer input may contribute to the DC offset. Even the occurrence of an RF burst without modulation may lead to a rise of the DC signal at the mixer output. Furthermore, any relative offset drift of the carrier signal, for example caused by a slight miss match of the local oscillator with respect to the incoming RF signal, may distort the baseband signal. Due to the high gain of the baseband amplifier of the receiver, the amplified DC offset may therefore lead to a misinterpretation of the actual small signal in the decoder.

To overcome the severe concerns raised by the generated DC offset, a compensation thereof is required. The DC offset may be reduced by employing a DC notch filter or a high pass filter. The high pass filter may cut off the undesired low frequencies effecting the DC offset. For example, a large coupling capacitor may be employed to AC couple the output of the mixer to the channel decoder input.

The modulated RF signal is further adversely affected by noise and interference during the transmission of the signal from the transmitter to the receiver. The interference may be caused, for example by multi-path propagation and/or by a frequency dependence of transmit or receive stages contained in the entire transmission path. Particularly, the multi-path propagation effect leads to a severe signal distortion. Due to signal reflection, for example, caused by buildings or, for in-house applications, by the surrounding walls, the signal may propagate on different paths from the transmitter to the receiver. Thus, the propagation time for each path may be different. Different propagation times may lead to an interference of serially-transmitted signals with each other. That means a signal may interfere with other prior-transmitted or post-transmitted signals. In order to substantially regenerate the signal, commonly, a channel interference compensation is performed. For compensating for the interference caused by the post-transmitted signals (precursor interference), typically, a so-called feedforward filter is employed. The precursor interference may be compensated for, by introducing a delay to the received signal to gain the required information of the posteriori submitted signals for the compensation process. Knowing the characteristic of the transmission channel, the influence of the precursor signal on the actual signal may then be determined and consequently the precursor interference may be compensated.

For compensation for interference of signals emitted prior to the signal of interest, a different approach has to be employed since the previously transmitted signals, causing this so-called postcursor interference, already reached the subsequent filter stage. Thus the previously transmitted signals have to be delayed to derive a postcursor compensation signal in an appropriately configured feedback filter. Typically, a decision feedback equalizer (DFE) is employed to compensate for the postcursor interference. A decision feedback equalizer constitutes an attractive compromise between complexity and performance. The decision feedback equalizer performs almost as well as a complex maximum likelihood sequence estimation (MLSE) method at a complexity only slightly higher than a linear equalizer.

With reference to FIG. 1a, a receiver topography for direct conversion employing a decision feedback equalizer and a DC offset compensation will be described in more detail.

FIG. 1a depicts a block diagram of a direct conversion receiver 100. The receiver device 100 comprises a demodulator 110 including an RF stage 111 and a DC offset compensation stage 112, a channel decoder 130 including precursor interference compensation circuit 140, and a source decoder 160 including a complimentary code key correlator 170.

In operation, an RF signal from an antenna (not shown) is fed into the RF stage 111 including an RF amplifier, typically configured as a low noise amplifier (LNA), and a local oscillator (LO) tuned to substantially oscillate at the carrier frequency. The amplified carrier signal and the local oscillator signal are fed to a mixer to convert the RF signal directly into a base band signal. Typically, a quadrature mixer is employed to generate an inphase (I) signal and a quadrature (Q) signal. The quadrature signal is generated by applying an oscillator signal to the mixer input, which is shifted in phase by 90°. The RF stage 111 may further comprise tunable RF filters to select the desired RF frequency band. The output signals (I) and (Q) of the mixer are then supplied to the DC offset compensation stage 112, which may be configured as a high pass filter. The cutoff frequency of the high pass filter is, however, a trade off between DC offset compensation and loss of information of the baseband signal. That means the cutoff frequency has to be chosen to be as low as possible while still maintaining the DC offset compensation.

The high-pass filtered signal is then supplied to the channel decoder 130 that is configured to compensate for noise and interference introduced to the transmitted signal by the transmission channel. As pointed out above, particularly multi-path propagation may introduce severe intersignal interference, i.e. precursor and postcursor interference. While precursor interference is typically reduced in the feedforward filter 140 by delaying posteriori transmitted signals, the postcursor interference reduction requires a different compensation scheme, commonly realized by the decision feedback equalizer 150, which will be described in more detail with reference to FIG. 1b.

FIG. 1b depicts a typical conventional arrangement of the decision feedback equalizer 150 comprising an adding stage 154, a decision device 155 and a finite impulse response filter 156.

In operation, an output signal r(k) of a feedforward filter 140, already compensated for precursor interference but still containing a postcursor interference, is fed to a first input terminal of the adding stage 154. A postcursor interference compensation signal c(k) is received at a second input terminal of the adding stage 154 so that an interference compensated signal $x_{res}(k)$ is obtained at an output of the adding stage 154 that is supplied to the source decoder stage 160. The interference compensation signal c(k) is derived from the interference compensated signal $x_{res}(k)$ by supplying it to the decision device 155 to make a decision on that signal. That means, the signal supplied to the decision device 155 is quantized, typically in a single bit analog/digital converter, to generate a so-called hard decision signal $x_q(k)$. The hard decision signal $x_q(k)$ is temporarily stored in a decision buffer (not shown) included in the finite impulse response filter 156. By means of the finite impulse response filter 156 having a impulse response denoted as b, the compensation signal c(k) is derived from the buffered signal sequence. Typically, the impulse response b of the feedback filter is optimized with respect to the impulse response of the transmission channel. The generated filtered signal, that is the postcursor interference compensation signal c(k), is subtracted from the output signal r(k) of the feedforward filter 140 in the adding stage 154 to produce the precursor and postcursor interference compensated signal $x_{res}(k)$. The concept of the decision feedback equalizer is based on the assumption of correct past decisions, meaning that all previous output signals $x_q(k)$ from the decision device 155 are assumed to coincide with the transmitted signals they estimate. Of course, this assumption is not completely correct. For low error rates, however, the assumption is approximately met and the decision feedback equalizer 150 performs well.

However, in the presence of notches, i.e. specified range of suppressed frequencies in the frequency spectrum of the input signal r(k) of the decision feedback equalizer 150, the assumption of a correct past decision is no longer valid, and therefore error bursts may be generated in the compensated signal $x_{res}(k)$ due to unreliable decisions in the hard decision signal $x_q(k)$ output by the decision device 155. Notches may typically be produced in a conventional device during frequency and phase offset compensation in combination with and DC offset compensation, as will be explained with reference to FIG. 2.

FIG. 2 schematically shows the magnitude $|\hat{r}(e^{j\Omega})|$ of the signal r(k) in the frequency domain in the presence of the high pass filter 112. The combined effect of the DC offset correction by the high pass filter 112 and the frequency offset correction may result in a distinctive notch in the frequency spectrum centered around the negative normalized frequency offset due to the frequency offset correction. The notch in turn may lead to unreliable decisions in the decision device 155 so that the feedback mechanism in the decision feedback equalizer 150 may significantly degrade. Thus, frequency offset correction in combination with the employment of a hard decision feedback equalizer may cause undesired error bursts in the interference compensated signal $x_{res}(k)$. As a consequence, the transfer rate and/or the coverage, for example, in wireless local area networks may significantly be deteriorated.

It is thus important to improve the interference compensation for signals comprising a notch in the frequency spectrum so that the occurrence of increased error rates may be prevented or at least reduced.

SUMMARY OF THE INVENTION

The present invention is based on the inventors' finding that the stability of the decision feedback loop in the presence of a notch in the spectrum of a baseband signal is enhanced in that a notch compensation signal established on the basis of a decision signal and an output signal of the decision feedback loop is fed back to the input signal.

In one embodiment, an equalizing circuit for a direct conversion receiver device comprises an input configured to receive a baseband signal and an output configured to output a compensated baseband signal. A decision feedback circuit is connected between the input and the output and a notch compensation feedback circuit is connected to the decision feedback circuit and the input.

In a further illustrative embodiment an equalizing circuit for a direct conversion receiver device comprises a decision feedback filter configured to provide a postcursor interference compensation signal for a received baseband signal. The circuit further comprises a notch compensation circuit configured to generate a notch compensation signal on the basis of the postcursor interference compensation signal. Additionally, an adding stage is provided and is configured to receive and combine the baseband signal, the postcursor interference compensation signal and the notch compensation signal.

According to a further illustrative embodiment, a direct conversion receiver device comprises an offset compensation stage configured to compensate a DC offset and a frequency offset of a baseband signal and a feedforward filter stage configured to reduce a precursor interference of an applied input signal and to provide a precursor interference reduced signal. The device further comprises an equalizing circuit. The equalizing circuit comprises a decision feedback filter configured to provide a postcursor interference compensation signal for a received baseband signal, a notch compensation circuit configured to generate a notch compensation signal on the basis of said postcursor interference compensation signal, and an adding stage configured to receive and combine said precursor interference reduced signal, said postcursor interference compensation signal and said notch compensation signal.

According to a further illustrative embodiment, a direct conversion receiver device, comprises an offset compensation stage configured to compensate a DC offset and a frequency offset of a baseband signal and a feedforward filter stage configured to reduce a precursor interference of an applied input signal and to provide a precursor interference reduced signal. The device further comprises an equalizing circuit. The equalizing circuit comprises an input configured to receive said precursor interference reduced signal, an output configured to output a compensated baseband signal, a decision feedback circuit connected between said input and said output, and a notch compensation feedback circuit connected to said decision feedback circuit and said input.

In a further embodiment, a method of reducing a notch in a frequency spectrum of a baseband signal comprises generating a hard decision signal from the baseband signal and filtering the hard decision signal to generate a postcursor interference compensation signal. The postcursor interference compensation signal is subtracted from the baseband signal to reduce postcursor interference of the baseband signal. Then, a notch compensation signal is generated on the basis of the hard decision signal and the postcursor interference compensation signal. Additionally, the notch compensation signal is combined with the baseband signal to reduce the notch in the frequency spectrum of the baseband signal.

BRIEF DESCRIPTION OF THE DRAWINGS

Further advantages, objects and embodiments of the present invention are defined in the appended claims and will become more apparent with the following detailed description when taken with reference to the accompanying drawings, in which:

DETAILED DESCRIPTION

Figure 1A:
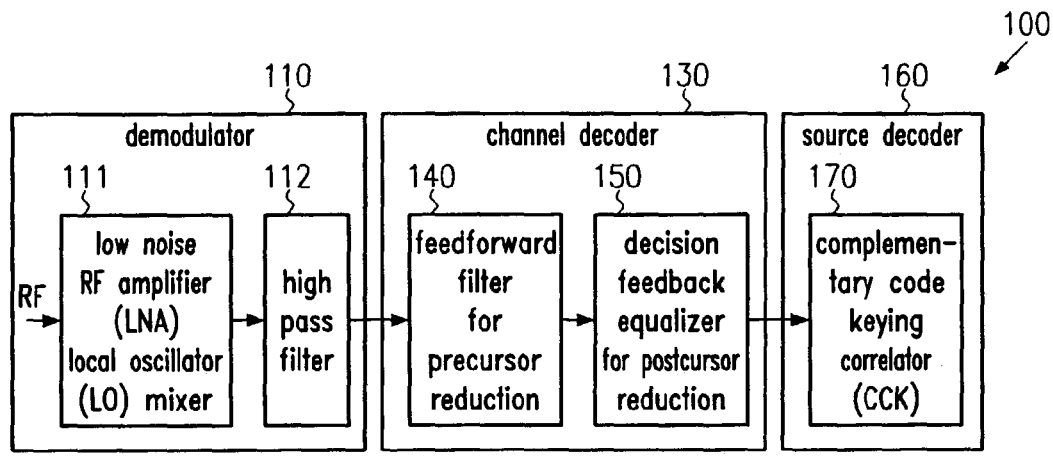
FIG. 1a schematically shows a block diagram of a direct conversion receiver device.

While the present invention is described with reference to the embodiments as illustrated in the following detailed description as well as in the drawings, it should be understood that the following detailed description as well as the drawings are not intended to limit the present invention to the particular illustrative embodiments disclosed, but rather the described illustrative embodiments merely exemplify the various aspects of the present invention, the scope of which is defined by the appended claims.

Figure 3:
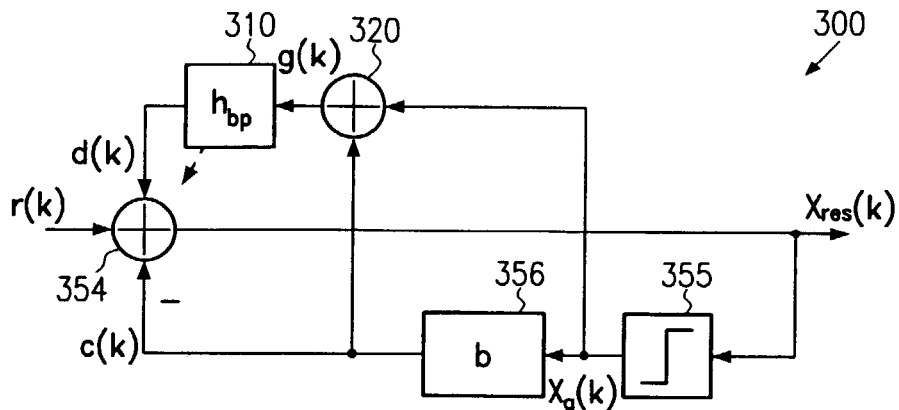
FIG. 3 schematically depicts a diagram of a decision feedback equalizer with a notch compensation stage according to the present invention.

With reference to FIG. 3, illustrative embodiments of an equalizing circuit having a notch compensation feedback loop will now be described. An equalizing circuit 300 comprises an first adding stage 354 configured to receive at a first input thereof a signal r(k), supplied from a feedforward filter, such as the feedforward filter 140 in FIG. 1a. An output of the adder stage 354 is connected to an input of a decision device 355 the output of which is connected to an FIR filter 356 having a filter response b. An output of the FIR filter 356 is connected to a second input of the adder stage 354. The decision device 355, the FIR filter 356 and the first and second inputs of the adder stage 354 form a decision feedback loop similar to that of the conventional device shown in FIG. 1a.

Additionally to the conventional device, a third input of the adder stage 354 is connected to a notch compensating stage 310 that in one embodiment is configured as an infinite impulse response bandpass filter. The notch compensating stage 310 is further connected to an output of a second adder stage 320, a first input of which is connected to the output of the decision device 355 and a second input of which is connected to the output of the FIR filter 356. The notch compensating stage 310 forms in combination with the second adder stage 320 a notch compensating feedback loop for providing an output signal d(k), wherein output signals $x_q(k)$ and c(k) of the decision device 355 and the FIR filter 356, respectively, are used as input signals.

Figure 1B:
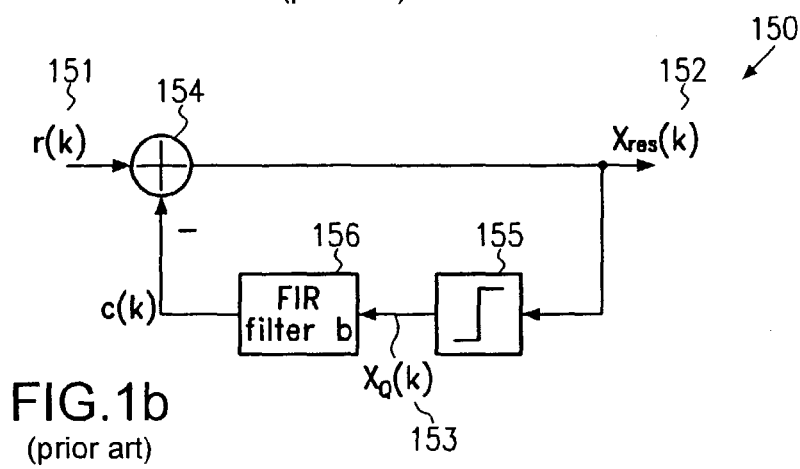
FIG. 1b schematically shows a diagram of a decision feedback equalizer according to he prior art.

In operation, the notch compensation stage 310 generates the compensation signal d(k) on the basis of the signals $x_q(k)$ and c(k), which is fed to the first adding stage 354, where it is added to the difference of the precursor interference reduced signal r(k) and the postcursor interference compensation signal c(k) provided by the feedback loop formed of the filter 356 and the decision device 355, as explained with reference to FIG. 1b. By appropriately configuring the notch compensation stage 310, as will be described later in more detail, the output signal of the adding stage 354 is provided as output signal $x_{res}(k)$ having a significantly reduced notch and exhibiting the desired reduced precursor and postcursor interference, which may then be supplied to a subsequent source decoder for further processing.

Figure 2:
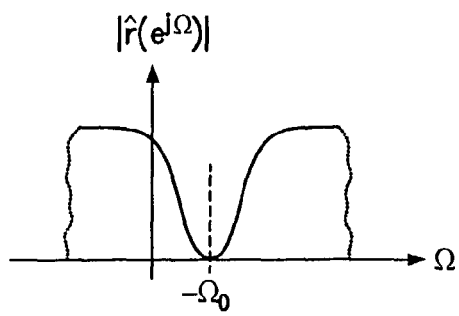
FIG. 2 shows a frequency diagram depicting the frequency response of the baseband signal after DC offset compensation and precursor reduction.

The notch compensation stage 310 substantially reduces the notch in the baseband signal r(k) as shown in FIG. 2. An according appropriate compensation signal, that is, the signal d(k), may therefore be generated and added to the baseband signal to substantially "fill" the notch.

Figure 4:
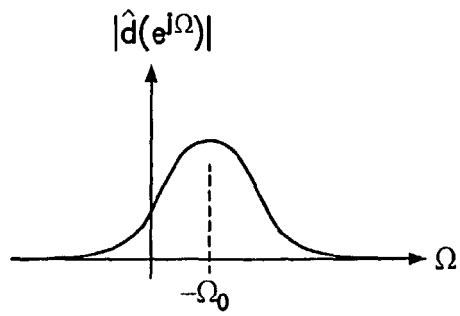
FIG. 4 shows a frequency diagram depicting a frequency response of a notch compensation signal.

FIG. 4 shows a frequency diagram, wherein the horizontal axis indicates the normalized frequency and the vertical axis represents the signal magnitude frequency response of the notch compensation signal d(k). The frequency response of the signal shows a typical bandpass characteristic with a center frequency corresponding to the negative normalized frequency offset $\Omega_0$.

According to one embodiment, a corresponding bandpass filter characteristic may be accomplished by filter coefficients derived from a first order discrete time lowpass filter. The frequency response of the filter may be obtained by a bilinear transformation of, for example, a corresponding continuous time Butterworth filter (without frequency prewarping) in the following way:

$$\hat{h}_{bp}(e^{j\Omega}) = \frac{a + ae^{-j\Omega}}{1 + be^{-j\Omega}}$$

where $$a = \frac{1}{1 + \frac{f_s}{\pi f_{c,bp}}} \quad \text{and} \quad b = \frac{1 - \frac{f_s}{\pi f_{c,bp}}}{1 + \frac{f_s}{\pi f_{c,bp}}}$$

and $f_s$ is the signal processing frequency of the basic lowpass filter and $f_{c,bp}$ the target cutoff frequency in Hz. The frequency response of a corresponding bandpass filter is then given by $$\hat{h}_{bp}(e^{j\Omega}) = \hat{h}_{lp}(e^{j(\Omega + \Omega_o)}) = \frac{a + ae^{-j\Omega_o}e^{-j\Omega}}{1 + e^{-j\Omega_o}be^{-j\Omega}}$$

For implementation purposes, a state space representation of the filter is convenient. This yields $$x_s(k) = Ax_s(k-1) + g(k-1) \quad (1)$$

$$d(k) = Cx_s(k) + ag(k) \quad (2)$$

where g and d is the input and output of the filter respectively, and $x_s$ denotes the internal state. The filter coefficients A and C are given by $$A = -be^{-j\Omega_o} \approx -b(1 - j\Omega_o)$$

$$C = a(1-b)e^{-j\Omega_o} \approx a(1-b)(1 - j\Omega_o)$$

The approximation is reasonable for $|\Omega_o| \ll 1$.

The frequency offset may vary during the operation of the receiver device. Thus, the center frequency has to be adapted to the varying frequency offset. The coefficient update for the lowpass-bandpass transformation may be accomplished, once an estimate of the normalized frequency offset $\Omega_o$ is available.

The target cutoff frequency is related to the cutoff frequency $f_{c,hp}$ of the RF high pass filter. It is, however, difficult to derive the target frequency $f_{c,bp}$ directly from the cutoff frequency $f_{c,hp}$ of the highpass filter. Thus, in illustrative embodiments, the corresponding frequencies may be determined experimentally, or in other embodiments, by a computer simulation.

The obtained value may be stored in a value table which is accessible by the receiver during the coefficient update of the bandpass filter.

An appropriate value for the signal processing frequency of the lowpass filter $f_s$, for example, in a wireless LAN receiver application is $f_s = 11,0*10^6$ Hz. Appropriate target cutoff frequencies $f_{c,bp}$ for the bandpass filter with reference to the cutoff frequencies $f_{c,hp}$ of the highpass filter are shown in Table 1.

TABLE 1 appropriate cutoff frequencies for WLAN application

| cutoff frequency of the highpass filter $f_{c,hp}$ | estimated cutoff frequency of the bandpass filter $f_{c,bp}$ |
|---|---|
| 20 kHz | 30 kHz |
| 50 kHz | 110 kHz |

Figure 5:
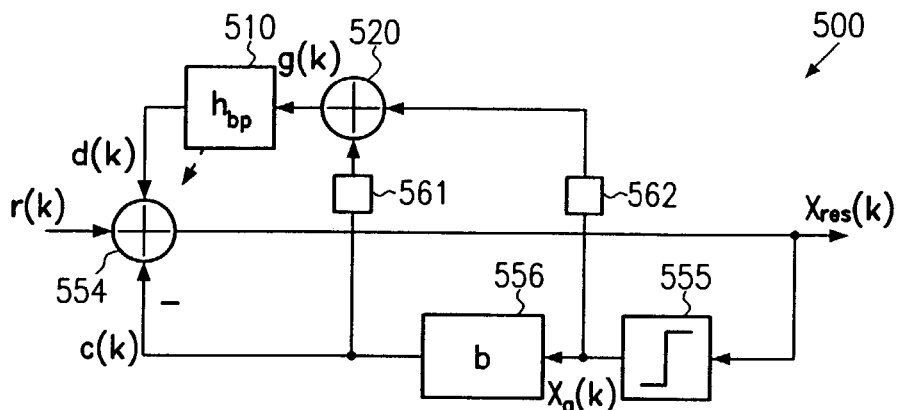
FIG. 5 schematically depicts a further embodiment of a decision feedback equalizer with additionally employed registers.
Figure 6:
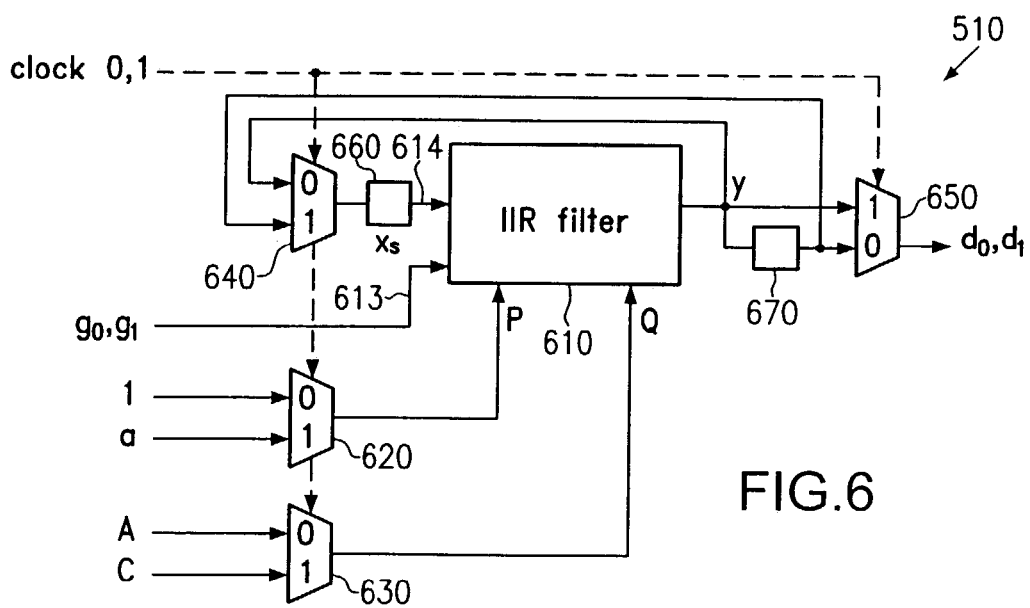
FIG. 6 schematically depicts the architecture of the filter of the notch compensation stage according to the present invention.

With reference to FIGS. 5 and 6 a further illustrative embodiment will now be described, wherein like parts and signals are denoted by the same reference signs as used in FIG. 3, except for a leading "5" instead of a leading "3". For convenience, a description of these identical parts and signals is omitted.

FIG. 5 depicts an equalizing circuit 500 having substantially the same configuration as in FIG. 3 with two additional registers 561 and 562 provided at the first and second inputs of the second adder stage 520.

In this way, the feedback loops formed, on the one side, by the decision device 555 and the FIR filter 556, and on the other side by the second adder stage and the bandpass filter 510, may be "decoupled" to achieve a higher degree of stability.

In operation, the input signals $x_q(k)$ and c(k) of the second adder stage 520 are temporarily stored in the registers 562 and 561, respectively, and may then be provided with the desired timing to the input terminal of the second adding stage 520. The timing of the registers 561, 562 and of the entire equalizing circuit 500 is dependent on the timing of the baseband signal. Thus, in one embodiment the notch compensation signal d(k) generated in the notch compensation stage 510 is calculated in a two step calculation process, so that the clock frequency of the notch compensation stage 510 is selected twice the signal processing frequency.

It should be noted that other appropriate timing sequences may be selected depending on the algorithms used for determining the notch compensation signal d(k) and the filter configuration used.

FIG. 6 schematically depicts the architecture of the notch compensation stage 510 for a operation frequency that is twice the signal processing frequency. The notch compensation stage 510 comprises an infinite impulse response filter 610 having coefficient inputs P and Q and signal inputs 613, 614, two filter coefficient input multiplexer 620 and 630, an internal filter state multiplexer 640 and an output multiplexer 650. The notch compensation stage 510 further comprises buffer registers 660 and 670 to temporarily store an internal filter stage signal and the output signal respectively.

In operation, a clock signal for triggering the signal processing triggers the notch compensation stage 510 twice, that is the filter operation is accomplished within two consecutive clock ticks (0,1) of the basic clock signal. On clock state (0), the first set of filter coefficients is applied to the input terminals P and Q. According to Equation 1, input P is set by means of the multiplexer 620 to 1 and input Q is set by means of the multiplexer 630 to A. The input terminal 613 is set to $g_0(k-1)$ and the input terminal 614 is set to the internal filter state $x_s(k-1)$. The resulting filter output signal $x_s(k)$ is fed to the output multiplexer 650, the internal filter state multiplexer 640 and the register 670. Thus, when the clock state changes to 1, the newly calculated value $x_s(k)$ is supplied to the input multiplexer 640 and to the internal state register 660. Thus, for the second filter operation, the internal state is updated and fed to the input terminal 614. The filter coefficients P and Q are changed to a and C respectively. The input value changes to $g_1(k)$ and is fed to the input 613. Thus, the new filter output value $d_1(k)$ is calculated according to Equation 2.

The filter operation is then repeated for each subsequent pair of clock ticks. The output signal d1(k) of the output multiplexer 650 represents the notch compensation signal d(k) and is fed to the first adding stage 554 (FIG. 5) to compensate or at least reduce the notch in the baseband signal.

By implementing a notch compensation stage as described with reference to FIGS. 3 to 6 into a direct conversion receiver as for example described with reference to FIG. 1a, the reliability of the hard decisions in the decision feedback scheme may significantly be improved, even in the presence of a notch in the base band signal, thereby reducing error bursts on the interference reduced signal. Therefore, the data transfer rate and/or the coverage of a date transfer equipment, for example, a wireless local area network, may be improved.

Further modifications and variations of the present invention will be apparent to those skilled in the art in view of this description. Accordingly, the description is to be construed as illustrative only and is for the purpose of teaching those skilled in the art the general manner of carrying out the present invention. It is to be understood that the forms of the invention shown and described herein are to be taken as the presently preferred embodiments.

The invention claimed is:

1. An equalizing circuit for a direct conversion receiver device, comprising:
   an input configured to receive a baseband signal;
   an output configured to output a compensated baseband signal;
   a decision feedback circuit connected between said input and said output; and
   a notch compensation feedback circuit connected to said decision feedback circuit and said input.

2. The equalizing circuit of claim 1, wherein said decision feedback circuit comprises a decision device and a finite impulse response filter.

3. The equalizing circuit of claim 2, wherein said notch compensation feedback circuit is connected to an output of said decision device and an output of said finite impulse response filter.

4. The equalizing circuit of claim 1, wherein the notch compensation feedback circuit comprises a bandpass filter.

5. The equalizing circuit of claim 1, wherein said bandpass filter is configured to be adaptable to a specified frequency during operation.

6. The equalizing circuit of claim 3, wherein said notch compensation feedback circuit further comprises a first register connected to said output of said decision device and a second register connected to the output of said finite impulse response filter.

7. An equalizing circuit for a direct conversion receiver device, comprising:
   a decision feedback filter configured to provide a postcursor interference compensation signal for a received baseband signal;
   a notch compensation circuit configured to generate a notch compensation signal on the basis of said postcursor interference compensation signal; and
   an adding stage configured to receive and combine said baseband signal, said postcursor interference compensation signal and said notch compensation signal.

8. The equalizing circuit of claim 7, wherein the decision feedback filter comprises a decision device configured to receive said baseband signal and to output a decision signal, wherein said notch compensation signal is generated on the basis of said decision signal.

9. The equalizing circuit of claim 7, wherein said notch compensation circuit comprises a bandpass filter configuration.

10. The equalizing circuit of claim 9, wherein said bandpass filter configuration is configured to be adaptable to a specified frequency during operation.

11. The equalizing circuit of claim 8, wherein said notch compensation circuit further comprises an adding stage having a first input connected to receive said decision signal, a second input connected to receive said postcursor interference compensation signal.

12. The equalizing circuit of claim 11, further comprising a first register and second register, the first and second registers connected with an output thereof to the first and second inputs respectively, and being arranged to receive and temporarily store said decision signal and said postcursor interference compensation signal.

13. A direct conversion receiver device, comprising:
   an offset compensation stage configured to compensate a DC offset and a frequency offset of a baseband signal;
   a feedforward filter stage configured to reduce a precursor interference of an applied input signal and to provide a precursor interference reduced signal;
   an equalizing circuit for a direct conversion receiver device, the equalizing circuit comprising:
      a decision feedback filter configured to provide a postcursor interference compensation signal for a received baseband signal;
      a notch compensation circuit configured to generate a notch compensation signal on the basis of said postcursor interference compensation signal; and
      an adding stage configured to receive and combine said precursor interference reduced signal, said postcursor interference compensation signal and said notch compensation signal.

14. The direct conversion receiver device of claim 13, wherein the decision feedback filter comprises a decision device configured to receive said baseband signal and to output a decision signal, wherein said notch compensation signal is generated on the basis of said decision signal.

15. The direct conversion receiver device of claim 13, wherein said notch compensation circuit comprises a bandpass filter configuration.

16. The direct conversion receiver device of claim 15, wherein said bandpass filter configuration is configured to be adaptable to a specified frequency during operation.

17. The direct conversion receiver device of claim 14, wherein said notch compensation circuit further comprises an adding stage having a first input connected to receive said decision signal, a second input connected to receive said postcursor interference compensation signal.

18. The direct conversion receiver device of claim 17, further comprising a first register and second register, the first and second registers connected with an output thereof to the first and second inputs respectively, and being arranged to receive and temporarily store said decision signal and said postcursor interference compensation signal.

19. A direct conversion receiver device, comprising:
   an offset compensation stage configured to compensate a DC offset and a frequency offset of a baseband signal;
   a feedforward filter stage configured to reduce a precursor interference of an applied input signal and to provide a precursor interference reduced signal;
   an equalizing circuit for a direct conversion receiver device, the equalizing circuit comprising:
      an input configured to receive said precursor interference reduced signal;
      an output configured to output a compensated baseband signal;
      a decision feedback circuit connected between said input and said output; and
      a notch compensation feedback circuit connected to said decision feedback circuit and said input.

20. The direct conversion receiver device of claim 19, wherein said decision feedback circuit comprises a decision device and an finite impulse response filter.

21. The direct conversion receiver device of claim 20, wherein said notch compensation feedback circuit is connected to an output of said decision device and an output of said finite impulse response filter.

22. The direct conversion receiver device of claim 19, wherein the notch compensation feedback circuit comprises a bandpass filter.

23. The direct conversion receiver device of claim 19, wherein said bandpass filter is configured to be adaptable to a specified frequency during operation.

24. The direct conversion receiver device of claim 22, wherein said notch compensation feedback circuit further comprises a first register connected to said output of said decision device receive and second register connected to the output of said finite impulse response filter.

25. A method of reducing a notch in a frequency spectrum of a baseband signal, including a notch in its frequency spectrum, the method comprising:
    generating a hard decision signal from said baseband signal;
    filtering the hard decision signal to generate a postcursor interference compensation signal;
    subtracting the postcursor interference compensation signal from the baseband signal to reduce postcursor interference of the baseband signal;
    generating a notch compensation signal on the basis of said hard decision signal and said postcursor interference compensation signal; and
    combining the notch compensation signal with the baseband signal to reduce the notch in the frequency spectrum of the baseband signal.

26. The method of claim 25, wherein generating a notch compensation signal comprises determining a frequency offset produced in receiving and processing said baseband signal.

27. The method of claim 26, wherein generating a notch compensation signal comprises adapting filter coefficients to said frequency offset.

28. The method of claim 27, wherein said filter coefficients define an infinite impulse response bandpass filter.

29. The method of claim 28, further comprising establishing a relationship between a cutoff frequency of a highpass filter applied to the baseband signal and a cutoff frequency of said bandpass filter.

30. The method of claim 25, wherein generating said notch compensation signal includes:
    providing said postcursor interference compensation signal, said hard decision signal and said baseband signal in synchronism with a baseband clock signal,
    and generating said notch compensating signal within one clock period.

31. The method of claim 30, wherein said hard decision signal and said postcursor interference compensation signal are temporarily stored in a register element.

* * * * *